(12) United States Patent
Lin

(10) Patent No.: US 6,247,814 B1
(45) Date of Patent: Jun. 19, 2001

(54) PROJECTING DEVICE FOR DISPLAYING ELECTRONIC IMAGES

(75) Inventor: Shang-Yi Lin, Taipei (TW)

(73) Assignee: Primax Electronics Ltd., Taipei Hsien (TW)

(*) Notice: Subject to any disclaimer, the term of this patent is extended or adjusted under 35 U.S.C. 154(b) by 0 days.

(21) Appl. No.: 09/421,246

(22) Filed: Oct. 20, 1999

(30) Foreign Application Priority Data

Sep. 3, 1999 (CN) ............................................... 088115259

(51) Int. Cl.$^7$ ................................................. G03B 21/14
(52) U.S. Cl. ........................... 353/20; 353/33; 349/9
(58) Field of Search ............................... 353/20, 31, 33, 353/34, 37; 349/5, 89

(56) References Cited

U.S. PATENT DOCUMENTS

| | | | |
|---|---|---|---|
| 4,749,259 | * 6/1988 | Ledebuhr | 353/33 |
| 4,842,374 | * 6/1989 | Ledebuhr | 353/31 |
| 5,105,265 | * 4/1992 | Sato et al. | 353/31 |
| 5,153,752 | * 10/1992 | Kurematsu et al. | 353/31 |
| 5,274,968 | * 1/1994 | Haven et al. | 353/31 |
| 6,113,239 | * 9/2000 | Sampsell et al. | 353/31 |
| 6,183,091 | * 2/2001 | Johnson et al. | 353/20 |

* cited by examiner

Primary Examiner—William Dowling
(74) Attorney, Agent, or Firm—Winston Hsu

(57) ABSTRACT

A light source generates a trichromatic beam of polarized light with red, green and blue components. An input lens set comprising a dichromatic mirror and a retarder film separates the trichromatic beam into a polarized monochromatic beam and a perpendicular bichromatic beam. The bichromatic beam comprises two monochromatic beams with opposite polarizations. The monochromatic beam and bichromatic beam from the input lens set are transmitted into an optic module. The monochromatic beam bounces off of a polarization beam splitter mirror into a first of three modulation units. The modulation units generate a modulated reflected beam with an opposite polarization of the input beam. The modulated reflected monochromatic beam passes through the polarization beam splitter mirror to a dichroicmirror and is reflected into a projecting lens. The bichromatic beam is split by another polarization beam splitter mirror. One beam is transmitted to the second modulation unit, the other is reflected to the third modulation unit. The second modulated beam refects off the polarization beam splitter to pass through the dichroic mirror into the projecting lens. The third modulated beam transmits through the polarization beam splitter mirror and the dichroic mirror to the projecting lens.

20 Claims, 5 Drawing Sheets

PROJECTING DEVICE FOR DISPLAYING ELECTRONIC IMAGES

BACKGROUND OF THE INVENTION

1. Field of the Invention

The present invention relates to a projecting device, and more particularly, to a projecting device for displaying electronic images.

2. Description of the Prior Art

Please refer to FIG. 1. FIG. 1 is a schematic diagram of a projecting device 10 of an LCD projector according to the prior art. The projecting device 10 comprises a light source 12, a uniform illumination optical device 14, a light-separating device 16, a trichromatic prism 18, three modulating devices 20, a projecting lens 22 and three focussing lenses 17, 19 and 21. The light source 12 produces a white beam of light. The uniform illumination optic device 14 installed in front of the light source 12 converges the light emitted from the light source 12 into an approximately square-shaped beam with a uniformly distributed illumination. The light-separating device 16 separates the square-shaped beam into red (R), green (G) and blue (B) color input beams. The approximately square-shaped trichromatic prism 18, having three input sides 18a and an output side 18b, combines the red (R), green (G) and blue (B) input beams into an output beam. The three modulating devices 20 are installed in front of their associated input sides 18a of the trichromatic prism 18 to modulate the three input beams. The three focusing lenses, 17, 19 and 21, separately installed in front of the three modulating devices 20, focus the three input beams from the light-separating device 16 onto the three modulating devices 20. The projecting lens 22 installed in front of the output side 18b of the trichromatic prism 18 projects the combined output beam from the trichromatic prism 18 onto a screen 24. Each modulating device 20 consists of a transparent monochromatic liquid crystal display panel used to display a monochromatic image. The trichromatic prism 18 combines the three monochromatic images to form the output color image.

The light-separating device 16 comprises a first dichroic mirror 26 to separate the red light from the square-shaped white beam from the uniform illumination optic device 14. A reflecting mirror 27 reflects the red light from the first dichroic mirror 26 onto the focusing lens 17. The remaining light reflects from the dichroic mirror 26 to a second dichroic mirror 28 that separates out the blue light and reflects it to the focusing lens 19. Two optical lenses 30 and two reflecting mirrors 32 pass and reflect the remaining green light to the focusing lens 21.

FIG. 1 clearly shows that the distance traveled by the green light is much longer than that of the red and blue light. Since traveling distances affect light intensities, the two optical lenses 30 installed in front of the two reflecting mirrors 32 are essential to converge the green light so as to compensate for its loss of intensity.

However, the installation of the two optical lenses 30 makes the structure of the light-separating device 16 complicated and costly. It is therefore an important objective to provide a projecting device with a simple structure that can solve the problem of unequal traveling distances for the three color beams.

SUMMARY OF THE INVENTION

It is therefore a primary objective of the present invention to provide a projecting device to solve the above mentioned problems.

In a preferred embodiment, the present invention provides a projecting device comprising:

a light source for generating a polarized trichromatic beam which comprises red, green and blue beams of the same polarization;

first, second and third modulation units, each modulation unit being used for modulating a polarized monochromatic beam and changing its polarization by reflection;

an optic module comprising first and third polarization beam splitter mirrors and a second dichromatic mirror, the first and third polarization beam splitter mirrors being aligned approximately along a flat surface, the second dichromatic mirror being perpendicular to the flat surface; and an input lens set installed between the light source and the optic module comprising a fourth dichromatic mirror used for separating the polarized trichromatic beam into a polarized monochromatic beam and a polarized bichromatic beam, and a retarder film used for converting the polarization of one polarized monochromatic beam within the polarized bichromatic beam into another polarization, the polarized monochromatic beam and polarized bichromatic beam being input into the optic module in two mutually perpendicular directions;

wherein the polarized monochromatic beam is transmitted to the first polarization beam splitter mirror and the polarized bichromatic beam is transmitted to the third polarization beam splitter mirror, the first polarization beam splitter mirror transmits the monochromatic beam to the first modulation unit and transmits the first modulated beam reflected from the first modulation unit to the second dichromatic mirror, and the third polarization beam splitter mirror separates the polarized bichromatic beam into two polarized monochromatic beams which are separately transmitted to the second and third modulation units, and then transmits the second and third modulated beams reflected from the second and third modulation units to the second dichromatic mirror, and the second dichromatic mirror combines the first, second and third modulated beams to form an output beam.

It is an advantage of the present invention that the distances traveled by the red, green and blue beams are approximately equal and very short. So the projecting device 40 does not need to use extra lenses and mirrors and is simpler in structure, less expensive and more efficient.

This and other objectives of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
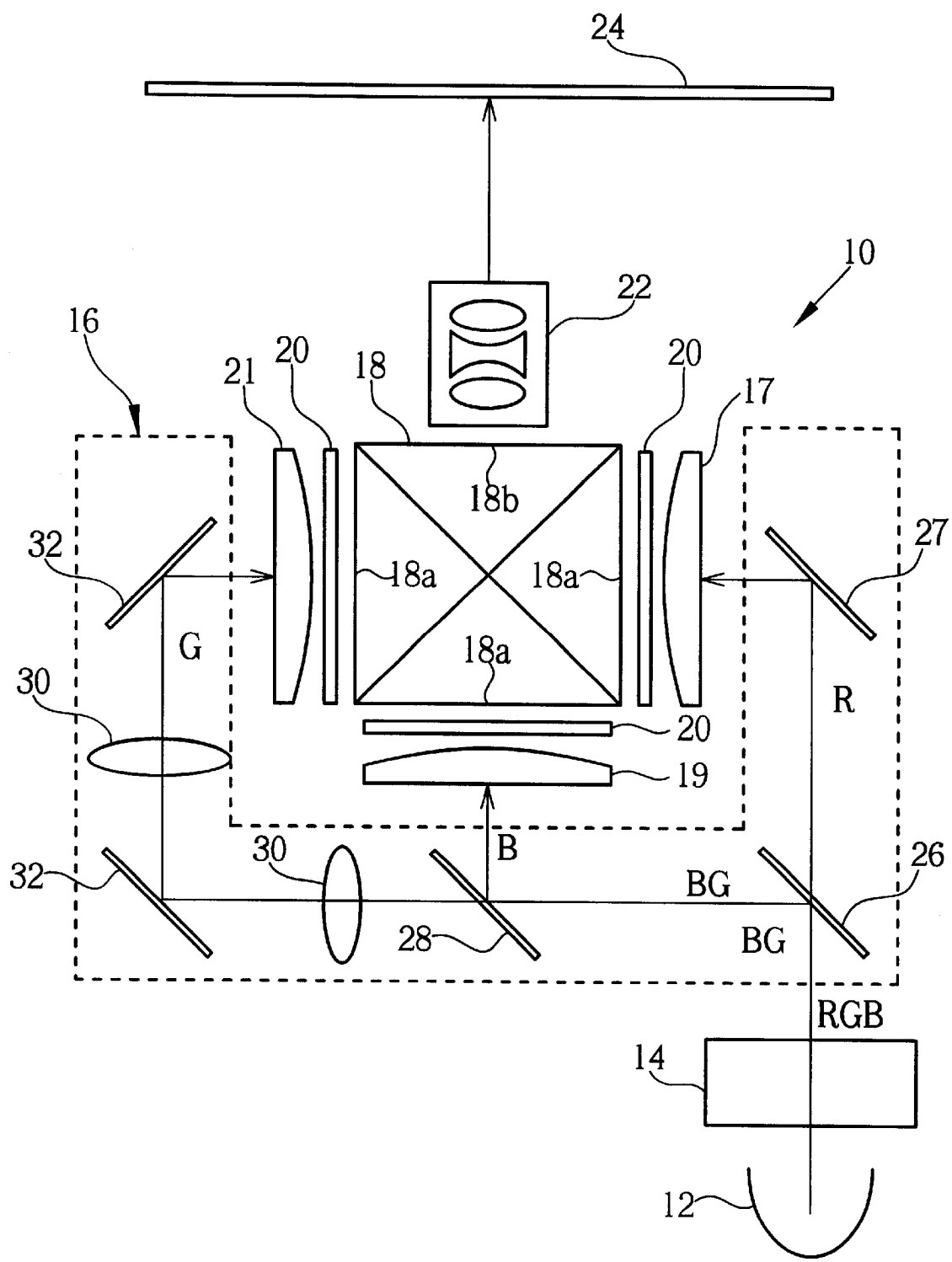
FIG. 1 is a schematic diagram of a projecting device for an LCD projector according to the prior art.
Figure 2:
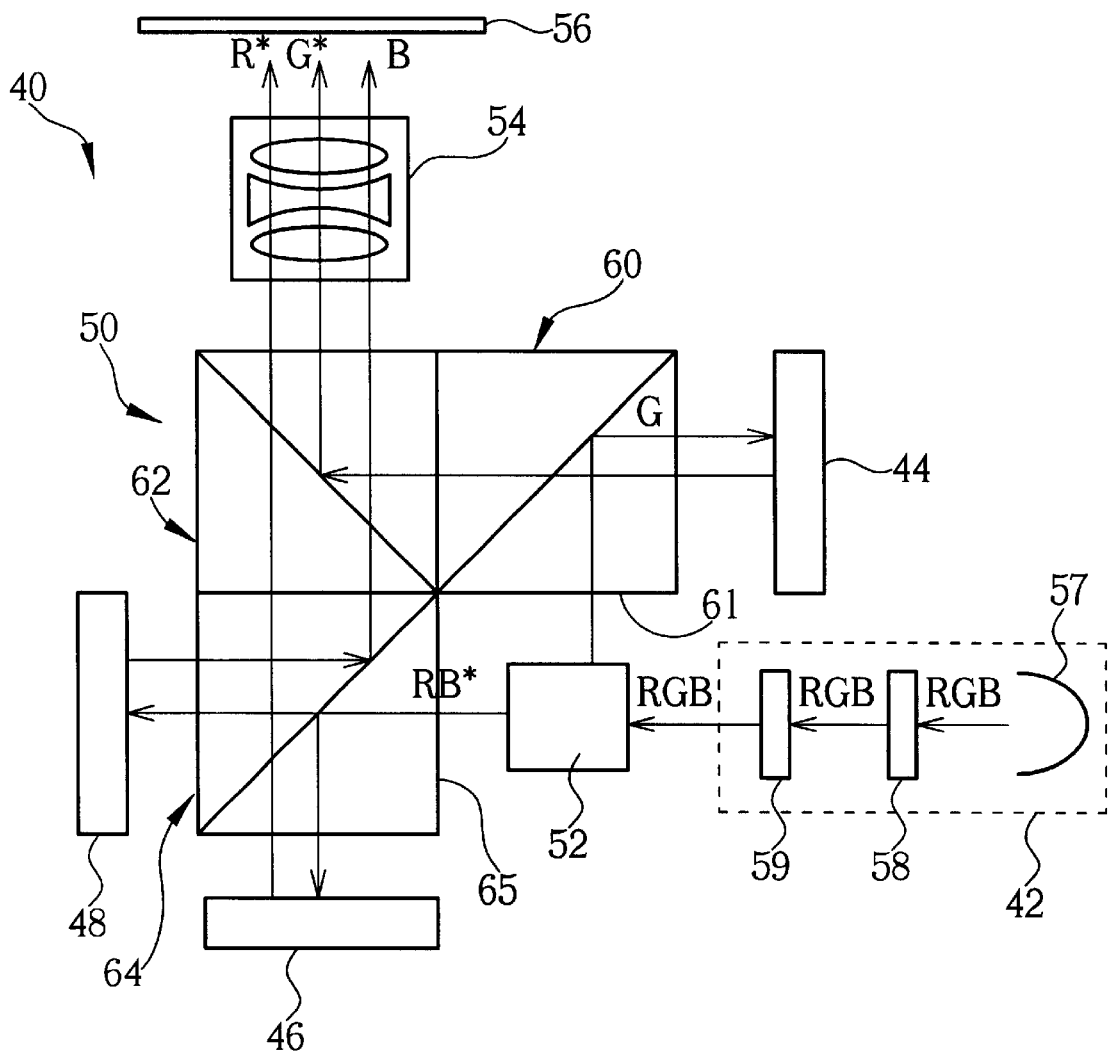
FIG. 2 is a schematic diagram of a projecting device for an LCD projector according to the present invention.

Please refer to FIG. 2. FIG. 2 is a schematic diagram of a projecting device 40 of an LCD projector according to the present invention. The projecting device 40 comprises a light source 42 for generating a polarized trichromatic beam which comprises red, green and blue beams of the same polarization; first, second and third modulation units 44, 46, 48, respectively, each being used for modulating a polarized monochromatic beam and changing its polarization by reflection; an L-shaped optic module 50 for controlling the path of each polarized monochromatic beam; an input lens set 52 installed between the light source 42 and the L-shaped optic module 50; and a projecting lens 54 used to project an output beam from the L-shaped optic module 50 onto a screen 56.

The light source 42 comprises a light tube 57 used to generate unpolarized trichromatic light with red, green and blue components; a polarization converter 58 used to convert the unpolarized trichromatic light into a polarized trichromatic beam and a light uniforming device 59 used to uniform the unpolarized trichromatic light emitted from the light tube 57 or the polarized trichromatic beam emitted from the polarization converter 58.

Figure 3:
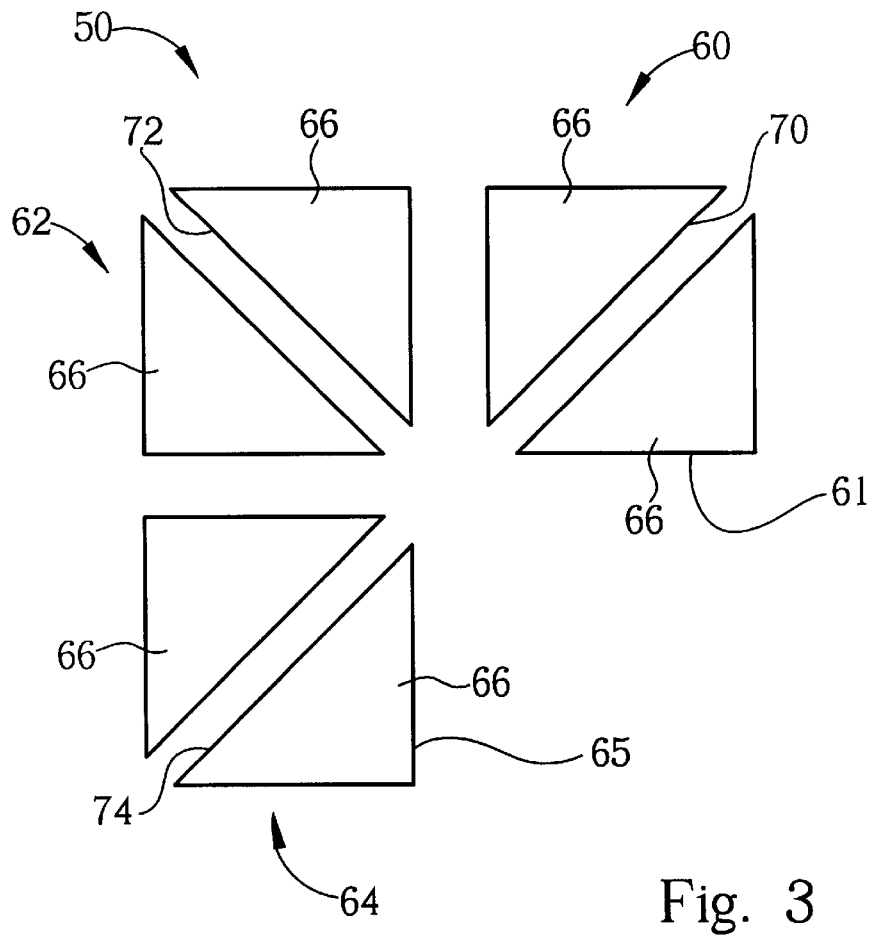
FIG. 3 is a schematic diagram of the L-shaped optic module shown in FIG. 2.

Please refer to FIG. 3. FIG. 3 is a schematic diagram of the L-shaped optic module 50 shown in FIG. 2. The L-shaped optic module 50 comprises first, second and third transparent rectangular columns 60, 62, 64. The three rectangular columns 60, 62, 64 are formed from six transparent triangular columns 66. The second rectangular column 62 is connected between the first and third rectangular columns 60, 64. Each polarization beam splitter mirror 70, 74 and a dichromatic mirror 72 is installed between two triangular columns 66. The first and third polarization beam splitter mirrors 70, 74 are separately installed along the diagonal faces of the first and third rectangular columns 60, 64. The second dichromatic mirror 72 is installed along the diagonal face of the second rectangular column 62. The first and third polarization beam splitter mirrors 70, 74 are aligned along an approximately flat surface, and the second dichromatic mirror 72 is perpendicular to the flat surface. The L-shaped optic module 50 comprises a right-angle-shaped recess formed by perpendicular sides 61, 65 of the first and third rectangular columns 60, 64 for receiving the polarized monochromatic beam and polarized bichromatic beam from the input lens set 52.

Figure 4:
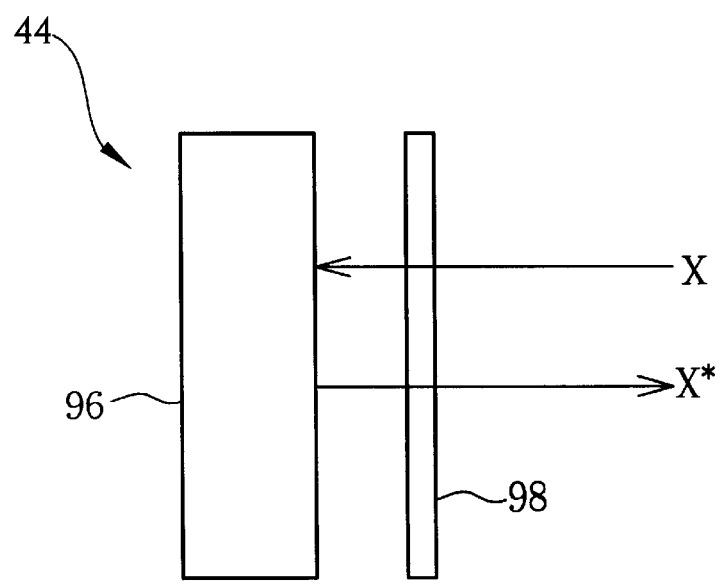
FIG. 4 is a schematic diagram of the first modulation unit shown in FIG. 2.

Please refer to FIG. 4. FIG. 4 is a schematic diagram of the first modulation unit 44 shown in FIG. 2. Each modulation unit 44, 46 and 48 comprises a reflective image modulating device 96 for reflecting an incident beam to generate a reflected beam, and a quarter-wave retarder 98 for retarding the incident beam and the reflected beam for a quarter of the beam's wavelength so that the incident beam and the reflected beam generated by the modulation unit 44 will have opposite polarizations. The reflective image modulating device 96 can be a digital micro-mirror device or a liquid crystal display.

Figure 5:
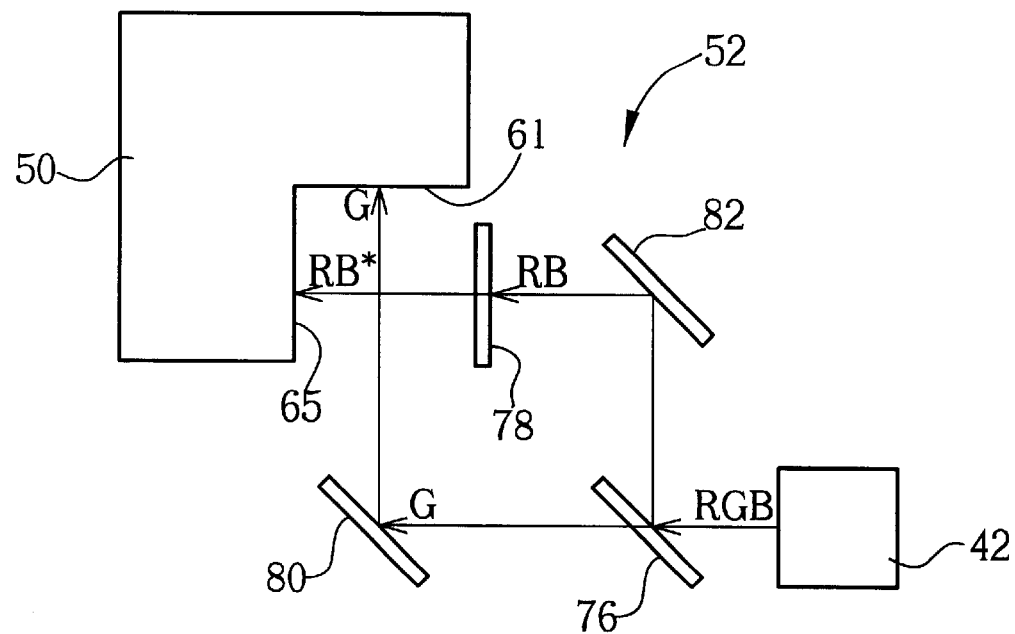
FIG. 5 is a schematic diagram of the input lens set shown in FIG. 2.

Please refer to FIG. 5. FIG. 5 is a schematic diagram of the input lens set 52 shown in FIG. 2. The input lens set 52 is installed between the light source 42 and the L-shaped optic module 50, and comprises a fourth dichromatic mirror 76 for separating the polarized trichromatic beam into a polarized green monochromatic beam and a polarized red and blue bichromatic beam. The input lens set 52 further comprises a retarder film 78 for converting the polarization of the polarized blue monochromatic beam within the polarized red and blue bichromatic beam to an opposite polarization, and two reflective mirrors 80, 82 for separately reflecting the green monochromatic beam and the red and blue bichromatic beam into the perpendicular sides 61 and 65 of the right-angle-shaped recess of the L-shaped optic module 50 in two mutually perpendicular directions. The green monochromatic beam is transmitted onto the first polarization beam splitter mirror 70 inside the first rectangular column 60 (FIG. 3), and the red and blue bichromatic beam is transmitted onto the third polarization beam splitter mirror 74 inside the third rectangular column 64.

Please refer to FIG. 2 and FIG. 3. The first polarization beam splitter mirror 70 reflects the green monochromatic beam to the first modulation unit 44. The first modulation unit 44 returns a modulated reflected beam with an opposite polarization that penetrates the first polarization beam splitter mirror 70 to the second dichromatic mirror 72 inside the second rectangular column 62. In an alternative arrangement (not shown) the first modulation unit 44 could also be placed outside the alternate triangular column 66 of the first rectangular column 60. In this case, the green monochromatic beam penetrates the first polarization beam splitter mirror 70, is transmitted to the first modulation unit 44, and the modulated reflected beam from the first modulation unit 44 is then reflected by the first polarization beam splitter mirror 70 onto the second dichromatic mirror 72.

The red polarized monochromatic beam within the bichromatic beam (red and blue) is reflected by the third polarization beam splitter mirror 74 to the second modulation unit 46. The oppositely polarized blue monochromatic beam of the bichromatic beam penetrates the third polarization beam splitter mirror 74 and is transmitted to the third modulation unit 48. The modulated red beam reflected from the second modulation unit 46 with an opposite polarization now penetrates the third polarization beam splitter mirror 74 and is transmitted to the second dichromatic mirror 72. The modulated blue beam reflected from the third modulation unit 48 is reflected by the third polarization beam splitter mirror 74 to the second dichromatic mirror 72.

Actually, the third polarization beam splitter mirror 74 can also deal with the red and blue beams in an alternative manner, initially reflecting the incident blue beam (instead of the red) and transmitting the incident red beam (instead of the blue). In this case, the second modulation unit 46 would be modulating a blue beam instead of red, and the third modulation unit 48 would be modulating a red beam instead of blue.

Finally, the modulated green beam transmitted through the first polarization beam splitter mirror 70 is reflected by the second dichromatic mirror 72 into a predetermined output direction. The modulated red and blue beams transmitted from the third polarization beam splitter mirror 74 penetrate the second dichromatic mirror 72 and continue along the predetermined output direction so that the red, green and blue modulated beams are combined and passed to the projecting lens 54. However, if the projecting lens 54 and the screen 56 are arranged outside an alternate triangular column 66 of the second rectangular column 62 (not shown), then the modulated green beam transmitted from the first polarization beam splitter mirror 70 penetrates the second dichromatic mirror 72 and transmits along a predetermined output direction. The modulated red and blue beams transmitted from the third polarization beam splitter mirror 74 are reflected by the second dichromatic mirror 72 into the predetermined output direction. Hence, the modulated green, red and blue beams are combined to form the output beam that is transmitted to the projecting lens 54.

Figure 6:
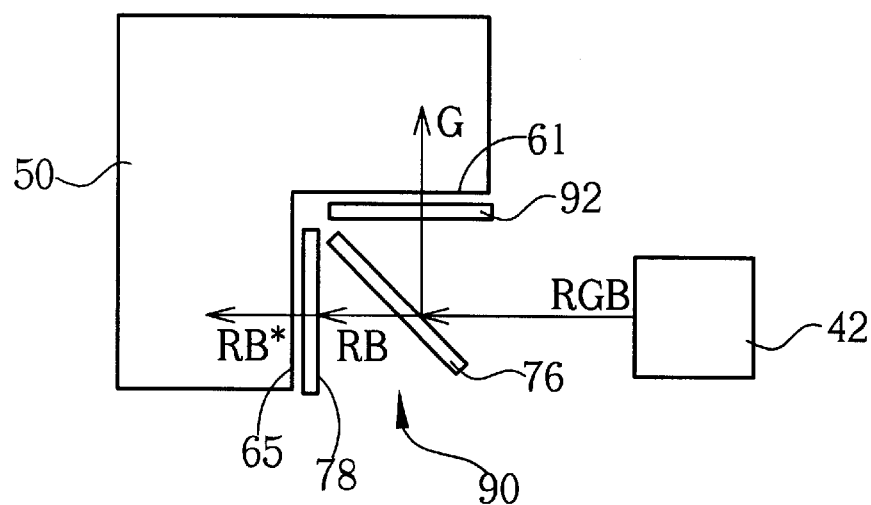
FIG. 6 is a schematic diagram of an alternative input lens set according to the present invention.

Please refer to FIG. 6. FIG. 6 is a schematic diagram of an alternative input lens set 90 according to the present invention. The fourth dichromatic mirror 76 of the input lens set 90 is positioned along a diagonal line between the two perpendicular sides 61, 65 of the recess of the L-shaped optic module 50. The retarder film 78 is attached to one of the two perpendicular sides of the recess to invert the polarization of the blue monochromatic beam within the polarized red and blue bichromatic beam transmitted from the fourth dichromatic mirror 76. The input lens set 90 further comprises a polarization film 92 attached to the other side of the recess for purifying the polarization of the polarized monochromatic beam transmitted from the fourth dichromatic mirror 76.

Figure 7:
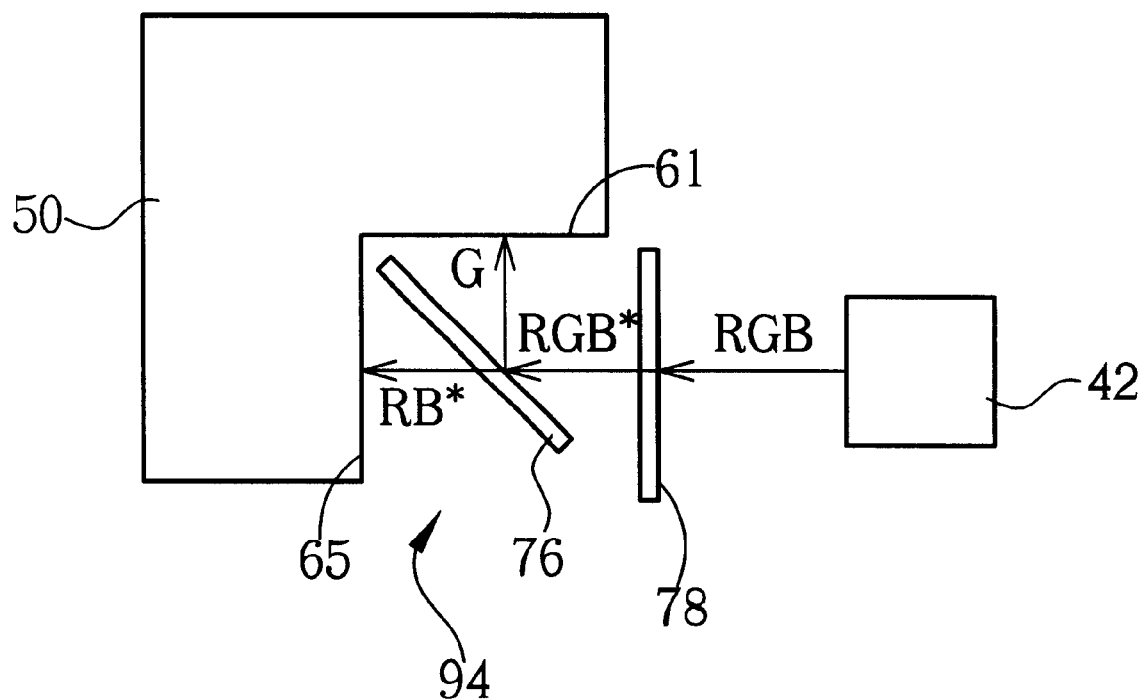
FIG. 7 is a schematic diagram of a third input lens set according to the present invention.

Please refer to FIG. 7. FIG. 7 is a schematic diagram of a third input lens set 94 according to the present invention. The fourth dichromatic mirror 76 of the input lens set 94 is located along a diagonal line between the two perpendicular sides 61, 65 of the recess of the L-shaped optic module 50. The retarder film 78 is located between the fourth dichromatic mirror 76 and the light source 42. The retarder film 78 of the input lens set 94 first inverts the polarization of the blue monochromatic beam within the polarized trichromatic beam (red, green, and blue). The fourth dichromatic mirror 76 separates the polarized trichromatic beam into a polarized green monochromatic beam and a polarized bichromatic beam that contains two polarized monochromatic beams (red and blue) with opposite polarizations.

The figures of the projecting device 40 clearly show that the distances traveled by the red, green and blue beams are approximately equal and very short. Consequently, the projecting device 40 does not need to use any extra lenses and mirrors to separate the beams or to compensate for differences in luminosity caused by unequal light paths. Furthermore, each component of the input lens sets 52, 90, 94 is installed in an adjustable way in the projecting device 40, so the user can easily adjust the light path of each incident beam. Compared to the projecting device 10 of the LCD projector according to the prior art, the projecting device 40 of the present invention has a very simple structure, is less expensive and more efficient.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A projecting device comprising:
   a light source for generating a polarized trichromatic beam which comprises red, green, and blue light of the same polarization;
   first, second and third modulation units, each modulation unit being used for modulating a polarized monochromatic beam and changing its polarization by reflection;
   an optic module comprising first and third polarization beam splitter mirrors and a second dichromatic mirror, the first and third polarization beam splitter mirrors being aligned approximately along a flat surface, the second dichromatic mirror being perpendicular to the flat surface; and
   an input lens set installed between the light source and the optic module comprising a fourth dichromatic mirror for separating the polarized trichromatic beam into a polarized monochromatic beam and a polarized bichromatic beam, and a retarder film for converting the polarization of one polarized monochromatic beam within the polarized bichromatic beam into another polarization, the polarized monochromatic beam and polarized bichromatic beam being input into the optic module in two mutually perpendicular directions;
   wherein the polarized monochromatic beam is transmitted to the first polarization beam splitter mirror and the polarized bichromatic beam is transmitted to the third polarization beam splitter mirror, the first polarization beam splitter mirror transmits the monochromatic beam to the first modulation unit and transmits the first modulated beam reflected from the first modulation unit to the second dichromatic mirror, and the third polarization beam splitter mirror separates the polarized bichromatic beam into two polarized monochromatic beams which are separately transmitted to the second and third modulation units, and then transmits the second and third modulated beams reflected from the second and third modulation units to the second dichromatic mirror, and the second dichromatic mirror combines the first, second and third modulated beams to form an output light beam.

2. The projecting device of claim 1 wherein the optic module is an L-shaped optic module and comprises first, second, and third transparent and rectangular columns, the second column is connected between the first and third columns, the first and third polarization beam splitter mirrors are separately installed inside the first and third columns along their diagonal lines, the second dichromatic mirror is installed inside the second column along one diagonal line, and the L-shaped optic module comprises a right-angle-shaped recess and is formed by one vertical side of each of the first and third columns for receiving the polarized monochromatic beam and polarized bichromatic beam from the input lens set.

3. The projecting device of claim 1 further comprising a projecting lens used for projecting the beam outputted from the second dichromatic mirror onto a screen.

4. The projecting device of claim 2 wherein the three rectangular columns are formed by using a plurality of transparent triangular columns and each polarization beam splitter mirror or dichromatic mirror is installed between two triangular columns.

5. The projecting device of claim 1 wherein the light source comprises a light tube used for generating an unpolarized trichromatic light having red, green, and blue light, and a polarization converter used for converting the unpolarized trichromatic light into a polarized trichromatic beam.

6. The projecting device of claim 5 wherein the light source further comprises a light uniforming device used for uniforming the unpolarized trichromatic light emitted from the light tube or the polarized trichromatic beam converted by the polarization converter along a predetermined direction.

7. The projecting device of claim 2 wherein the fourth dichromatic mirror of the input lens set firstly separates the polarized trichromatic beam into a polarized monochromatic beam and polarized bichromatic beam, then the retarder film converts the polarization of one polarized monochromatic beam within the polarized bichromatic beam into another polarization.

8. The projecting device of claim 7 wherein the input lens set further comprises two reflection mirrors used for perpendicularly transmitting the two beams into the two vertical sides of the recess of the L-shaped optic module.

9. The projecting device of claim 7 wherein the fourth dichromatic mirror is positioned along a diagonal line between the two vertical sides of the recess of the L-shaped optic module, and the retarder film is attached to one of the two vertical sides of the recess for converting the polarization of one polarized monochromatic beam within the polarized bichromatic beam transmitted from the fourth dichromatic mirror into another polarization.

10. The projecting device of claim 9 wherein the input lens set further comprises a polarization film attached to the other vertical side of the recess for purifying the polarization of the polarized monochromatic beam transmitted from the fourth dichromatic mirror.

11. The projecting device of claim 2 wherein the retarder film of the input lens set first converts the polarization of one polarized monochromatic beam within the polarized trichromatic beam into another polarization, and the fourth dichromatic mirror separates the polarized trichromatic beam into a polarized monochromatic beam and a polarized bichromatic beam which contains two polarized monochromatic beams of different polarizations.

12. The projecting device of claim 11 wherein the fourth dichromatic mirror is located along a diagonal line between the two vertical sides of the recess of the L-shaped optic module, and the retarder film is located between the fourth dichromatic mirror and the light source.

13. The projecting device of claim 1 wherein the first polarization beam splitter mirror reflects the monochromatic beam to the first modulation unit, and the first modulated beam reflected from the first modulation unit penetrates the first polarization beam splitter mirror and transmits to the second dichromatic mirror.

14. The projecting device of claim 1 wherein the monochromatic beam penetrates the first polarization beam splitter mirror and transmits to the first modulation unit, and the first modulated beam reflected from the first modulation unit is reflected by the first polarization beam splitter mirror into the second dichromatic mirror.

15. The projecting device of claim 1 wherein one polarized monochromatic beam within the bichromatic beam is reflected by the third polarization beam splitter mirror to the second modulation unit, the other polarized monochromatic beam of the bichromatic beam penetrates the third polarization beam splitter mirror and transmits to the third modulation unit, the second modulated beam reflected from the second modulation unit penetrates the third polarization beam splitter mirror and transmits to the second dichromatic mirror, and the third modulated beam reflected from the third modulation unit is reflected by the third polarization beam splitter mirror to the second dichromatic mirror.

16. The projecting device of claim 1 wherein each modulation unit comprises a reflective image modulating device for modulating an incident beam by reflection to generate a reflected beam, and a quarter-wave retarder used for retarding the incident beam and reflected beam for a quarter of the wavelength so that the incident beam and the reflected beam generated by the modulation unit have opposite polarizations.

17. The projecting device of claim 16 wherein the reflective image modulating device is a digital micro-mirror device.

18. The projecting device of claim 16 wherein the reflective image modulating device is a liquid crystal display.

19. The projecting device of claim 1 wherein the first modulated beam transmitted from the first polarization beam splitter mirror is reflected by the second dichromatic mirror to a predetermined output direction, and the second and third modulated beams transmitted from the third polarization beam splitter mirror penetrates the second dichromatic mirror and transmit along the predetermined output direction so that the first, second, and third modulated beams are combined to form the output light beam.

20. The projecting device of claim 1 wherein the first modulated beam transmitted from the first polarization beam splitter mirror penetrates the second dichromatic mirror and transmits along a predetermined output direction, and the second and third modulated beams transmitted from the third polarization beam splitter mirror are reflected by the second dichromatic mirror to the predetermined output direction so that the first, second, and third modulated beams are combined to form the output light beam.

* * * * *